Figure 1:
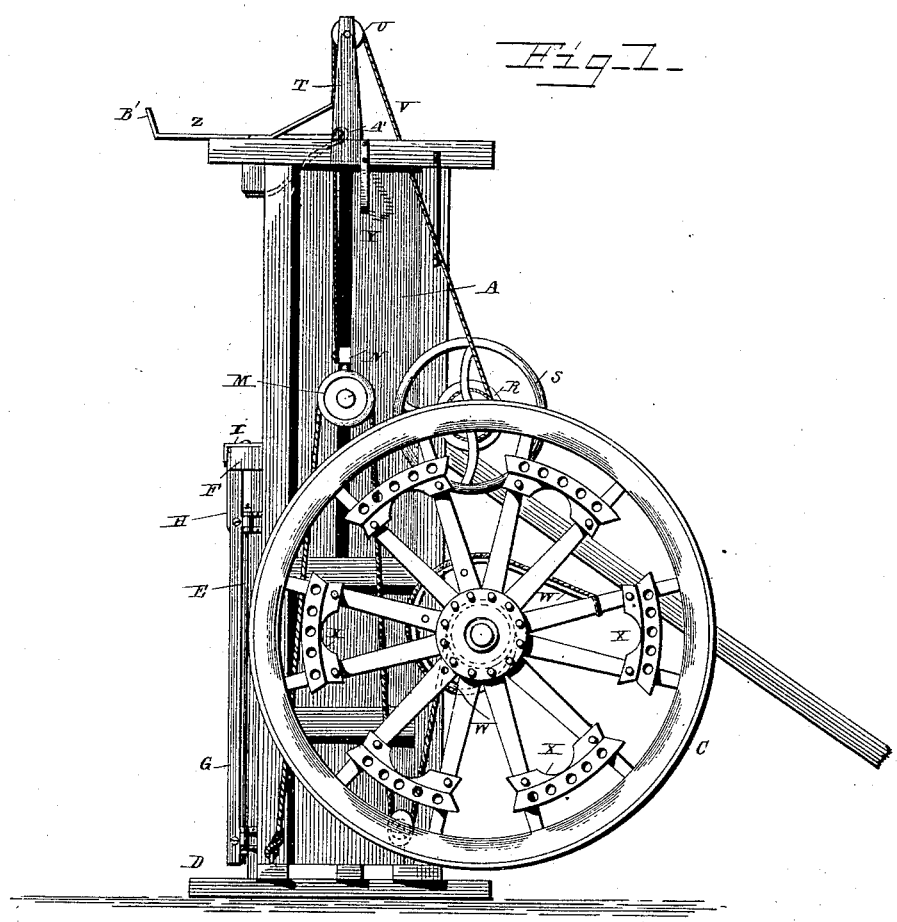

(No Model.) 2 Sheets—Sheet 1.

T. C. NARAMORE.
BALING PRESS.

No. 333,660. Patented Jan. 5, 1886.

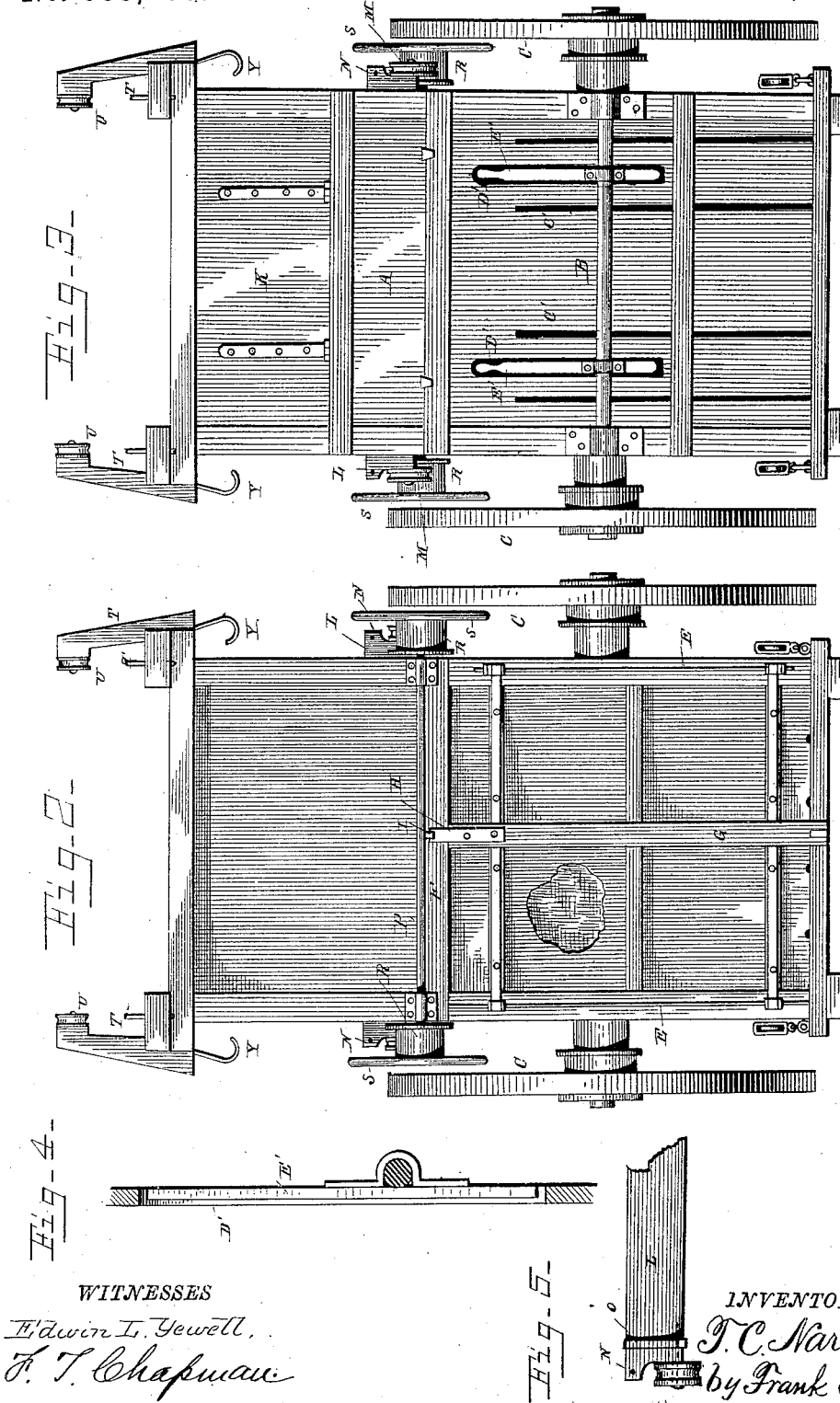

UNITED STATES PATENT OFFICE.

TRUMAN C. NARAMORE, OF LOS ANGELES, CALIFORNIA.

BALING-PRESS.

SPECIFICATION forming part of Letters Patent No. 333,660, dated January 5, 1886.

Application filed October 6, 1885. Serial No. 179,103. (No model.)

*To all whom it may concern:*

Be it known that I, TRUMAN C. NARAMORE, a citizen of the United States, residing at Los Angeles, in the county of Los Angeles and State of California, have invented certain new and useful Improvements in Baling - Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in baling-presses, and is designed to produce a device that is simple and effective in operation, and hence especially adapted for farm use, where an inexpensive machine is necessary.

A further object is to so combine a press and a cart that the same may be used interchangeably, thus much reducing the comparative cost of each device, as the invention combines two necessary articles used in farm and other work, making them mutually dependent, yet not interfering with the distinctive operation of either.

In the drawings, Figure 1 represents a side elevation of the device when used as a baling-press; Fig. 2, a front view thereof; Fig. 3, a rear view of the same; Fig. 4, a detail section showing one of the devices for throwing the bale from the press, and Fig. 5 a detail view of the follower-head.

The body A, axle B, and wheels C are similar in general construction to those of an ordinary cart. The rear end of the body is enlarged, as is shown at D, in order to firmly hold the said body perpendicularly when so placed. The body is divided by its functions into two compartments, the upper or forward end being the presser-box, and the lower or rear end being the bale-box. The bale-box is provided with doors, which are hinged to the box by means of rods E passing through eyes on the sides of the box and on the edges of the doors. The lower ends of said rods are secured by the end timbers of the body-frame, and the upper ends of the rods are secured by a cross-piece, F; or bolts may be employed at the ends of the rods to keep them in place.

To the front and center thereof of the bottom of the bale-box is pivoted a strip, G, having at the free end a metallic continuation, H, which is designed to engage under a staple or catch, I, on the piece F and prevent the doors from being forced open when the material is being pressed. On the opposite side of the body, and communicating with the presser-box, is a drop-door, K, of any suitable construction, or other means whereby the material to be pressed may be inserted.

The presser - box is provided on each side with a longitudinal slot for the projecting ends of the follower-head L. This head - block L has at each end a pulley, M, secured under the eyes N, or similar devices, by a bolt or pin, held in place by a yoke, O.

To what may be termed the "rear" side of the press is journaled a transverse shaft, P, carrying winding-drums R near each end, and also an operating hand-wheel, S. The top of the press carries uprights or posts T, on which are pulleys U, coinciding with the ends of the block L, and arranged to one side of the vertical center to throw the block on the track, hereinafter described. From the said block L, over the pulleys U, and to the drums R, extend the cords V, by means of which the plunger or follower may be raised. On the inner side of the wheels is secured a casting, W, in the shape of a two-thirds coil, and extending from the hub to about half the distance to the periphery.

By means of suitable tackle a rope passing over the pulley M connects to the wheel, one rope on each side of the body being employed. The casting will quickly take up the rope at the beginning of the operation of pressing, and from it the rope will pass to the hub and wind on it.

On the outside of the wheels are secured near the periphery a series of brackets, X, each forming a segment of a circle, and are so formed as to receive a rope and operate as a drum for holding the same. The said rope from each wheel is secured to a whiffletree when horse-power is used, and is dispensed with when hand-power is used, as the wheels may be grasped directly and turned.

To fill the press, the follower is elevated till it is above the top of the body, the rope by which the power is transmitted having been removed from the pulleys M and hung on the hooks Y, which depend from the frame-work on top the said press. The pulleys M are then placed on the track Z on top the press, and the follower run to one side out of the way. The track Z has a raised portion, A', on the inner end, acting as a stop, and an upturned portion, B', at the outer end, also acting as a stop. The hay, straw, cotton, or other material is then inserted and tramped down, or otherwise packed, the follower inserted, the ropes placed over the pulleys M, and the pressing mechanism operated. The bale-box doors are then opened and the bale tied after any approved fashion, the slots C' in the rear wall of the bale-box aiding in the proper placement of the bands or wires used. Normally resting within slots D' in the said rear wall of the said bale-box are the bale-extractors E', each consisting of a lever pivotally fulcrumed to the axle B, and having the upper ends or arms formed into handles. By means of these levers the bale is forced through the doors above mentioned, and is ready for transportation.

The parts more especially relating to the press are secured to the parts forming the cart proper by bolts or screws, and are readily removable. The hubs may be provided with any suitable ratchet mechanism to prevent the wheels from turning backward when in operation.

I claim—

1. A cart having its body portion provided with a press-chamber and a baling-chamber, and devices for operating a follower therein, substantially as and for the purpose specified.

2. A cart having its sides longitudinally slotted for the ends of the follower head-block, and the wheels acting as power winding-drums for ropes connected to said follower, substantially as specified.

3. The wheels with the casting forming a partial guide for the power-rope, combined with the slotted body and plunger or follower with the head-block projecting through said slots, substantially as specified.

4. The wheels with the external drums for applying the power, combined with a body forming the press and a follower operated upon by said wheels, to which it is connected by a rope, substantially as specified.

5. Wheels with segmental brackets secured on one side to form drums, and a casting forming a partial guide on the other side, a slotted body, and a follower connected to said wheels by ropes, the whole combined substantially as specified.

6. Combined with a slotted body, a follower with a head-block resting in said slots, and a shaft with winding-drums connected to said head-block by ropes to raise and lower the said follower, substantially as and for the purpose specified.

7. Combined with the slotted body, a follower with a head-block projecting through the said slots and carrying pulleys at each end, a drum-shaft journaled to said body and connected to the follower by ropes, and tracks on one end of said body for the reception of the said pulleys, substantially as described.

8. Combined with the body forming a press and the axle to which said body is secured, levers fulcrumed on said axle and normally resting in slots in said body, substantially as and for the purpose specified.

9. The combined cart and press consisting of a slotted body, a follower with a head carrying pulleys and projecting through said slots, tracks on one end of said body for the said pulleys, a drum-shaft journaled to the body and connected to the follower, an axle with levers fulcrumed thereto and normally resting in slots in said body, and wheels on said axles, said wheels having segmental brackets on one side and a partial guiding-casting on the other, and having connection to the follower, substantially as specified.

In testimony whereof I affix my signature in presence of two witnesses.

TRUMAN C. NARAMORE.

Witnesses:
A. A. MITCHELL,
GEO. J. CLARKE.